(12) United States Patent
Huang et al.

(10) Patent No.: US 8,108,131 B2
(45) Date of Patent: Jan. 31, 2012

(54) METHOD AND APPARATUS FOR USING AN ACCELEROMETER SIGNAL TO DETECT MISFIRING IN AN INTERNAL COMBUSTION ENGINE

(75) Inventors: Jian Huang, Richmond (CA); Duran Cheung, Vancouver (CA); David Mumford, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 12/788,276

(22) Filed: May 26, 2010

(65) Prior Publication Data

US 2010/0286891 A1    Nov. 11, 2010

Related U.S. Application Data

(63) Continuation of application No. PCT/CA2008/002085, filed on Nov. 27, 2008.

(51) Int. Cl.
*F02P 5/153* (2006.01)
*F02D 41/26* (2006.01)

(52) U.S. Cl. ............... 701/110; 701/111; 123/406.27; 123/435

(58) Field of Classification Search ............. 701/110, 701/111; 123/406.21, 406.24, 406.25, 406.27, 123/406.29, 406.34, 406.35, 406.36, 406.37, 123/406.38, 435; 73/35.03, 35.06, 35.07, 73/114.02
See application file for complete search history.

(56) References Cited

U.S. PATENT DOCUMENTS

| | | | |
|---|---|---|---|
| 4,899,710 A * | 2/1990 | Takahashi | 123/406.35 |
| 5,095,742 A | 3/1992 | James et al. | |
| 5,119,783 A | 6/1992 | Komurasaki | |
| 5,537,855 A | 7/1996 | Hunninghaus et al. | |
| 5,719,326 A * | 2/1998 | Vulih et al. | 73/35.07 |
| 6,145,491 A | 11/2000 | Wilstermann et al. | |
| 6,273,064 B1 * | 8/2001 | Scholl et al. | 123/406.24 |
| 6,388,444 B1 | 5/2002 | Hahn et al. | |
| 6,975,969 B2 * | 12/2005 | Sauler et al. | 702/189 |
| 7,181,338 B2 * | 2/2007 | Takemura et al. | 701/111 |
| 7,295,916 B2 * | 11/2007 | Sauler et al. | 701/111 |
| 7,415,347 B2 * | 8/2008 | Naber et al. | 701/111 |
| 7,571,640 B2 * | 8/2009 | Andrews | 73/114.07 |
| 2006/0129303 A1 | 6/2006 | Sauler et al. | |
| 2008/0035108 A1 | 2/2008 | Ancimer et al. | |
| 2008/0228341 A1 | 9/2008 | Orifij | |
| 2010/0286893 A1 * | 11/2010 | Huang et al. | 701/103 |

* cited by examiner

*Primary Examiner* — Hai Huynh
(74) *Attorney, Agent, or Firm* — McAndrews, Held & Malloy, Ltd.

(57) ABSTRACT

The method comprises operating an engine and collecting a real-time accelerometer signal from an accelerometer sensor. The real-time accelerometer signal is digitized and filtered to isolate data in a frequency range associated with combustion to produce a filtered signal data set. The filtered signal data set is integrated to produce an integrated signal data set, and misfire is detected by comparing the integrated signal data set with a predetermined reference data set associated with the same operating point. The apparatus is a control system for an engine that comprises an accelerometer sensor mounted to the engine; a look-up table in which is stored predetermined reference data sets, in association with predetermined operating conditions; and an electronic controller programmed to carry out the foregoing method.

25 Claims, 5 Drawing Sheets

METHOD AND APPARATUS FOR USING AN ACCELEROMETER SIGNAL TO DETECT MISFIRING IN AN INTERNAL COMBUSTION ENGINE

CROSS-REFERENCE TO RELATED APPLICATIONS

This application is a continuation of International Application No. PCT/CA2008/002085, having an international filing date of Nov. 27, 2008, entitled "Method And Apparatus For Using An Accelerometer Signal To Detect Misfiring In An Internal Combustion Engine". The '085 international application claimed priority benefits, in turn, from Canadian Patent Application No. 2,610,388 filed Nov. 29, 2007. The '085 international application is hereby incorporated by reference herein in its entirety.

STATEMENT OF GOVERNMENT INTEREST

This invention was made with Government support under DE-FC26-06NT42967 awarded by DOE. The Government has certain rights in this invention.

FIELD OF THE INVENTION

The present invention relates to a method and apparatus for using an accelerometer signal to detect misfiring in an internal combustion engine.

BACKGROUND OF THE INVENTION

Engine misfire occurs when charge delivered to an engine's combustion chamber fails to ignite. Misfire can be a symptom of unstable engine operating conditions and can cause inefficient engine operation, reduced engine power and performance, and high emissions of unburned fuel. Accordingly, it is desirable to detect engine misfire so that it can be diagnosed and so that steps can be taken to prevent it from re-occurring. There can be a number of different causes for engine misfire, such as reduced compression, which can be caused by worn piston rings, a failed head gasket, a worn crankshaft, intake or exhaust valves that are not seating properly. Another cause for engine misfire relates to the fuel injection system, for example, if the fuel injector is broken or not working properly to introduce the required amount of fuel. If the engine uses exhaust gas recirculation, the valve that controls the amount of exhaust gas that is recirculated could be broken or stuck, so that too much exhaust gas is recirculated. If an engine uses oxygen sensors or mass flow sensors to control the fuel air mixture the failure of one of these sensors could cause misfire. Engines that use an ignition assist, such as a spark-plug in Otto Cycle engines or a glow plug in Diesel Cycle engines, could misfire if the ignition assist device or the controls for timing or energizing the ignition assist device fails. These are only some examples of the causes for engine misfire, which illustrate the need to detect it so that corrective action can be taken. Depending upon the cause, this corrective action could be an adjustment to the operating parameters made by the engine's electronic control unit or the corrective action could involve a service inspection to determine the cause of the misfiring and maintenance service to repair or replace engine components.

Accelerometer sensors are sold commercially for use as knock sensors for detecting engine knock. Engine knock correlates to violent combustion events that can be caused by pre-mature and uncontrolled detonation of the charge inside the combustion chamber, caused, for example, if an Otto-Cycle engine has been fuelled with a fuel with too low an octane rating, or if spark timing is too advanced, or if deposits in a combustion chamber create hot spots that cause early ignition. In a Diesel-Cycle engine, engine knock can be caused, for example, if fuel injection timing is too early. Engine knock can cause a decrease in engine performance and in severe cases, if not corrected, engine knock can cause serious damage to the engine, including destruction of the pistons, connecting rods, exhaust valves, head gasket and spark plugs or glow plugs. Accelerometers that are employed as "knock sensors" are typically located on an engine's cylinder block and sometimes on the cylinder head. Wide-band knock sensors are simple transducers that transmit a signal to a knock processor chip that detects engine knock from the sensor signal. The knock processor chip sends a signal to the electronic engine controller when engine knock is detected. There are also knock sensors that transmit a binary signal when an element within them vibrates at a harmonic frequency that matches the knocking frequencies of the engine. Knock sensors of either type are only required to make crude measurements since they are configured to detect only engine knock and the difference between the signals when the engine is not knocking and when the engine is at a defined knocking level is sufficiently large to not require sensors with a high degree of accuracy. Wide-band knock sensors transmit signals that are proportional to frequencies that include vibrations in the knocking range, and hereinafter reference to knock sensors and accelerometer sensors are directed to wide-band knock sensors.

Recent developments have been made to show that by mounting an accelerometer sensor where there is a higher signal-to-noise ratio, accelerometer sensors can be used to detect deflections caused by changes in the in-cylinder pressure during combustion events that have much lower amplitudes than the deflections caused by engine knock. The component to which the accelerometer is attached can act like a damped oscillator. The accelerometer signal can be filtered to reduce the effects of noise so that the accelerometer signal can be used to determine information about engine combustion characteristics such as, for example, the timing for start of combustion, the heat release rate, and the peak heat release rate. However, from such an accelerometer signal it can be difficult to detect engine misfire under all operating conditions. At high load conditions, the amplitude of the accelerometer signal increases significantly when combustion occurs and when the expected rise in amplitude does not occur this is a good indication that misfire has occurred. However, at low load conditions and when the engine is idling, the amplitude of the deflections of the engine component where the accelerometer sensor is installed is much less compared to when under high load conditions, so the amplitude of the accelerometer signal is also lower. With lower signal amplitudes associated with combustion events under low load and idle conditions it can be difficult to detect misfire if there is signal noise in the accelerometer signal. Signal noise is unavoidable because the component to which the accelerometer sensor is mounted is also deflected by other effects such as, for example, engine vibration, road "noise" caused by uneven road conditions when the engine is installed in a vehicle, and deflections caused by the operation of other mechanical devices attached to the engine. While some signal noise can be filtered out, it can still be difficult to detect misfire, or the absence of combustion, since some signal noise inevitably remains in the filtered signal, and the amplitude of the signal noise can be difficult to distinguish from the signal component that is caused by the engine firing. Accordingly, there is a need for a robust and accurate method of using an accelerometer signal to detect misfire.

SUMMARY OF THE INVENTION

A method is provided for using a real-time accelerometer signal to detect misfire in an internal combustion engine. The method comprises operating the engine at an operating point, and collecting the real-time accelerometer signal from an accelerometer sensor that comprises data characteristic of a combustion parameter; digitizing and filtering the real-time accelerometer signal to isolate data in a frequency range associated with the combustion parameter to produce a filtered signal data set; integrating the filtered signal data set to produce an integrated signal data set; and, comparing the integrated signal data set with a predetermined reference data set associated with the operating point, to determine when misfire occurs.

The preferred method further comprises converting the filtered signal data set to absolute values prior to integrating it. This keeps the integrated values positive and amplifies the effect of the integration, which is a calculation of the area under the plot of the filtered signal data set. That is, whereas a plot of filtered signal data has on its vertical axis the filtered signal voltage, the plot of the integrated signal data has on its vertical axis the integration of the filtered signal voltage which is the area under the plot of the filtered signal voltage against time, here measured in crank angle degrees. Because the area is cumulative this magnifies the difference between signal noise and the signal associated with combustion, which enables the disclosed method to accurately detect engine misfire.

The preferred method can also further comprise subtracting a motoring component from the filtered signal data set before integrating it. This reduces the range of amplitude in the data and facilitates signal processing. To further reduce the data that needs to be processed, the method preferably further comprises sampling the real-time accelerometer signal for only a predetermined portion of the engine cycle that corresponds to when combustion occurs.

To detect misfire, the method can comprise comparing shapes of a plot of the integrated signal data set with that of the predetermined reference data set and detecting misfire when a predefined characteristic feature of a shape associated with the predetermined reference data set is absent from the integrated signal data set. In this example, the predefined characteristic feature is one that is associated with firing, so misfiring is detected when this feature is absent. Another approach would be to sample data corresponding to when the engine is misfiring, and determining a characteristic feature associated with misfiring, and then detecting misfire when this characteristic feature is found in the integrated signal data set.

The method preferably further comprises retrieving the predetermined reference data set from a look-up table. The predetermined reference data set can be stored and retrieved based on the engine speed and load. That is, engine speed and load can be the parameters that define the operating point that is associated with the predetermined reference data set and which is also associated with the real-time accelerometer signal. The data stored in the look-up table can be generated by a calibration engine which is the same model and specification as the engine from which the real-time accelerometer signal data set is collected. A calibration engine can have more instrumentation to confirm whether the engine is firing or misfiring, so that the predetermined reference data set is confirmed to be associated with either when the engine is firing or when it is misfiring. It does not matter which engine condition, (firing or misfiring), is associated with the predetermined reference data set, as long as the engine condition associated with the predetermined reference data set is known, so that firing or misfiring can be determined by comparing the integrated signal data set to the predetermined reference data set.

When the predetermined reference data set is collected from a calibration engine when it was firing, and the integrated data set is compared to the predetermined reference data set, misfire can be detected when a plot of the integrated signal data set does not include a slope within a predetermined range defined in relation to a characteristic slope associated with the predetermined reference data set. That is, in this example a plot of the predetermined reference data set typically includes a portion of the plot that has a much steeper slope, which corresponds to when combustion occurred, so if this slope (or a slope within a predefined range relative to this slope) is missing from a plot of the integrated signal data set, then it can be deduced that a misfire has occurred. Instead of comparing slopes, the predetermined reference data set can comprise a threshold limit associated with each operating point in the look-up table and the method can detect misfire when the integrated signal data set comprises data that does not exceed the threshold limit. For example, when the engine is operating under high load, the threshold limit can be higher than the threshold limit when the engine is idling.

The method can further comprise counting detected misfires, and when more than a predetermined number of misfires are counted, commanding the engine to operate with reduced power output until it can be diagnosed to determine why the misfires have occurred. Besides reducing power output, other responses are possible, individually or in combination, when the predetermined number of misfires is reached, or escalating responses can be introduced at progressively higher misfire number counts. For example, another response could be sending a warning to an operator of the engine so that the operator will be alerted to the need to have the engine diagnosed to determine why the engine is misfiring. Yet another response could be limiting how many times the engine can be re-started after a predetermined number of misfires has been counted to prevent the engine from being operated for a prolonged time without being diagnosed to determine why the misfires have occurred. These methods can be further refined to reduce the cumulative number count if a misfire is not detected for a prescribed amount of time, or to introduce a response before the predetermined number is reached if the frequency of detected misfires increases to a predefined frequency within a specified amount of time, or within a specified number of engine cycles.

To further improve the robustness of the method, the method can further comprise rejecting a determination that misfire has occurred if a secondary indicator of firing indicates that the engine did fire. By cross-checking with a secondary indicator, false, or uncertain, determinations of misfire are rejected.

A control system is provided for an internal combustion engine. The control system comprises an accelerometer sensor mounted to the internal combustion engine at a location where the accelerometer sensor can detect oscillations that correlate to a combustion parameter; a look-up table in which is stored a predetermined reference data set, in association with a predetermined operating condition; an electronic controller programmed to receive a real-time accelerometer signal from the accelerometer sensor when the engine is operating at the predetermined operating condition, to digitize and filter the real-time accelerometer signal to isolate data in a frequency range associated with the combustion parameter to produce a filtered signal data set, to integrate the filtered signal data set to produce an integrated signal data set, and to compare the integrated signal data set to the predetermined reference data set to determine when misfire occurs, and a signal wire for transmitting the signal from the accelerometer sensor to the electronic controller.

The electronic controller can be the electronic control unit ("ECU") for the engine, or it can be a separate electronic controller that communicates with the ECU. For a control system that is a modification or upgrade to an engine it is advantageous to use a separate electronic controller for processing the accelerometer signal and detecting engine misfires. However, if the disclosed method and apparatus is part of an engine system when it is being manufactured, it can be advantageous for the electronic controller to be incorporated as part of the ECU, which is also programmed to carry out the other functions normally associated with a typical ECU.

The real-time accelerometer signal is typically transmitted from the accelerometer sensor as an analogue signal. The electronic controller can digitize the real-time accelerometer signal by sampling from this signal with a predetermined frequency that provides the resolution needed to detect misfiring and any other combustion characteristics that are determined from the accelerometer signal.

The control system can further comprise a hardware filter between the accelerometer sensor and the electronic controller to pre-process the real-time accelerometer signal. When an engine is calibrated, frequencies that are characteristic of deflections caused by combustion can be identified. Accordingly, components of the accelerometer signal with frequencies different from these characteristic frequencies can be considered noise and filtered from the raw accelerometer signal. A hardware filter can comprise capacitors, resistors, and other circuitry to separate out components of the raw accelerometer signal that have frequencies different from the predetermined characteristic frequencies. For example, a low-pass filter could be used to filter out components of the raw accelerometer signal that have frequencies higher than the characteristic frequencies.

In preferred embodiments the real-time accelerometer signal is a voltage signal and the electronic controller is programmed to convert the voltage signal to absolute values before integrating it.

As with the described method, the electronic controller can be programmed to detect engine misfire by using one of the above described techniques for comparing the integrated signal data set to the predetermined reference data set. The electronic controller can also be programmed to count the number of misfires and to limit engine operation or signal an operator when the number of misfires counted exceeds a predetermined number. In addition to improve the robustness of the method the electronic controller can be programmed to reject a determination that misfire has occurred if a secondary indicator of firing indicates that the engine did fire.

DETAILED DESCRIPTION OF PREFERRED EMBODIMENT(S)

Figure 1:
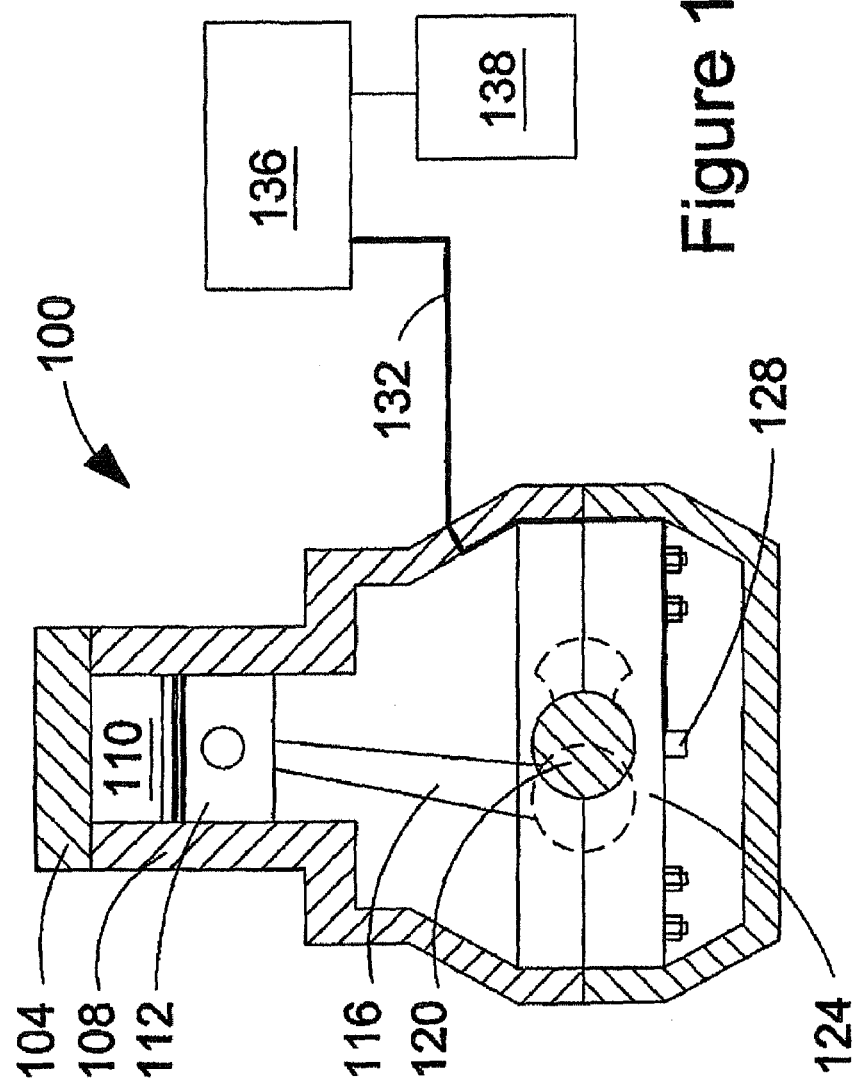
FIG. 1 is a schematic view of an engine equipped with an accelerometer sensor and a control system for detecting misfire from a signal collected from the accelerometer sensor.

FIG. 1, shows by way of example, an internal combustion engine with a control system that can be used to detect misfiring from an accelerometer signal. Engine 100 includes combustion chamber 110, which in this example is defined by cylinder 108, cylinder head 104 and piston 112. For simplicity, only one combustion chamber is shown although persons skilled in the technology will understand that the engine typically has two or more cylinders, and when there is a plurality of cylinders they can be arranged in banks. Piston 112 is reciprocable within cylinder 108, and the reciprocating motion of piston 112 is translated into rotation of crankshaft 120 via connecting rod 116 which is operatively attached at opposite ends to piston 112 and crankshaft 120. Intake and exhaust valves (not shown) operate to deliver charge comprising oxygen from an intake manifold to combustion chamber 110, and to remove exhaust by-products therefrom to an exhaust manifold. Engine 100 further comprises fuel and air delivery systems, and other standard systems associated with internal combustion engines.

Engine 100 includes accelerometer 128, shown mounted, for example, on main bearing cap 124. Bearing cap 124 acts as a damped oscillator by damping deflections caused by to sudden changes in the in-cylinder pressure. The characteristic frequency of this oscillation is a physical property of the bearing cap assembly and is nearly independent of engine operating conditions. It is also repeatable among engines of the same design and specification. By identifying and isolating this characteristic frequency, combustion information can be extracted from the accelerometer signal and analyzed. The engine bearing caps have been found to be suitable as locations for generating an accelerometer signal with a suitable signal-to-noise ratio, but accelerometer 128 can be mounted at other locations where there is also a suitable signal-to-noise ratio. In the context of this disclosure, when discussing "signal-to-noise ratio", the "signal" is the part of the accelerometer signal that is associated with deflections attributable to combustion behavior in combustion chamber 110, and "noise" is the part of the accelerometer signal that is contributed from other sources not directly attributable to combustion behavior, such as deflections caused by engine vibrations, road noise (for vehicles) or by electrical interference that distorts the electrical accelerometer signal. A preferred method of mounting accelerometer 128 is taught by co-owned U.S. patent application Ser. No. 11/695,474 filed Apr. 2, 2007 (Publication No. US 2008/0035108), entitled "Method of Mounting an Accelerometer on an Internal Combustion Engine and Increasing Signal-To-Noise Ratio". Accelerometer 128 transmits an electrical signal to electronic controller 136 through signal wire 132.

Electronic controller 136 can be the electronic control unit for the engine or a separate electronic controller that performs specific functions such as detecting misfiring, and that communicates with the engine's electronic control unit which controls the engine. Electronic controller 136 is programmed to receive a real-time accelerometer signal from accelerometer sensor 128 when engine 100 is operating, to digitize the real-time accelerometer signal, and to integrate data from the real-time accelerometer signal before comparing it to predetermined reference data retrieved from look-up table 138 that is associated with the operating point associated with the real-time accelerometer data. The predetermined reference data can be stored and retrieved from look-up table 138 based on engine operating conditions such as engine speed and load. Electronic controller 136 is programmed to compare the integrated real-time accelerometer signal data with the predetermined reference data, to determine when misfire occurs. In preferred embodiments the predetermined reference data is integrated accelerometer signal data collected in the same manner as the integrated real-time accelerometer signal data, except that the predetermined reference data was collected from a calibration engine, which was equipped with instrumentation to confirm whether the engine was firing or misfiring.

Experimental data has been collected from tests conducted using two Cummins™ model ISB engines. Prior to engine testing, all seven bearing caps on each engine were removed and machined for mounting accelerometer sensors, which in these experiments, were wide-band accelerometer sensors with an integrated cable design, which were made by Siemens™. Each engine was fully commissioned and baseline tests were conducted at the rated power and torque. A Kistler™ model 6607C1 water-cooled pressure transducer was installed in each cylinder, and used to measure the in-cylinder pressure. A Cummins™ high speed data acquisition system was used to collect the pressure and accelerometer sensor data generated during the engine testing.

Figure 2:
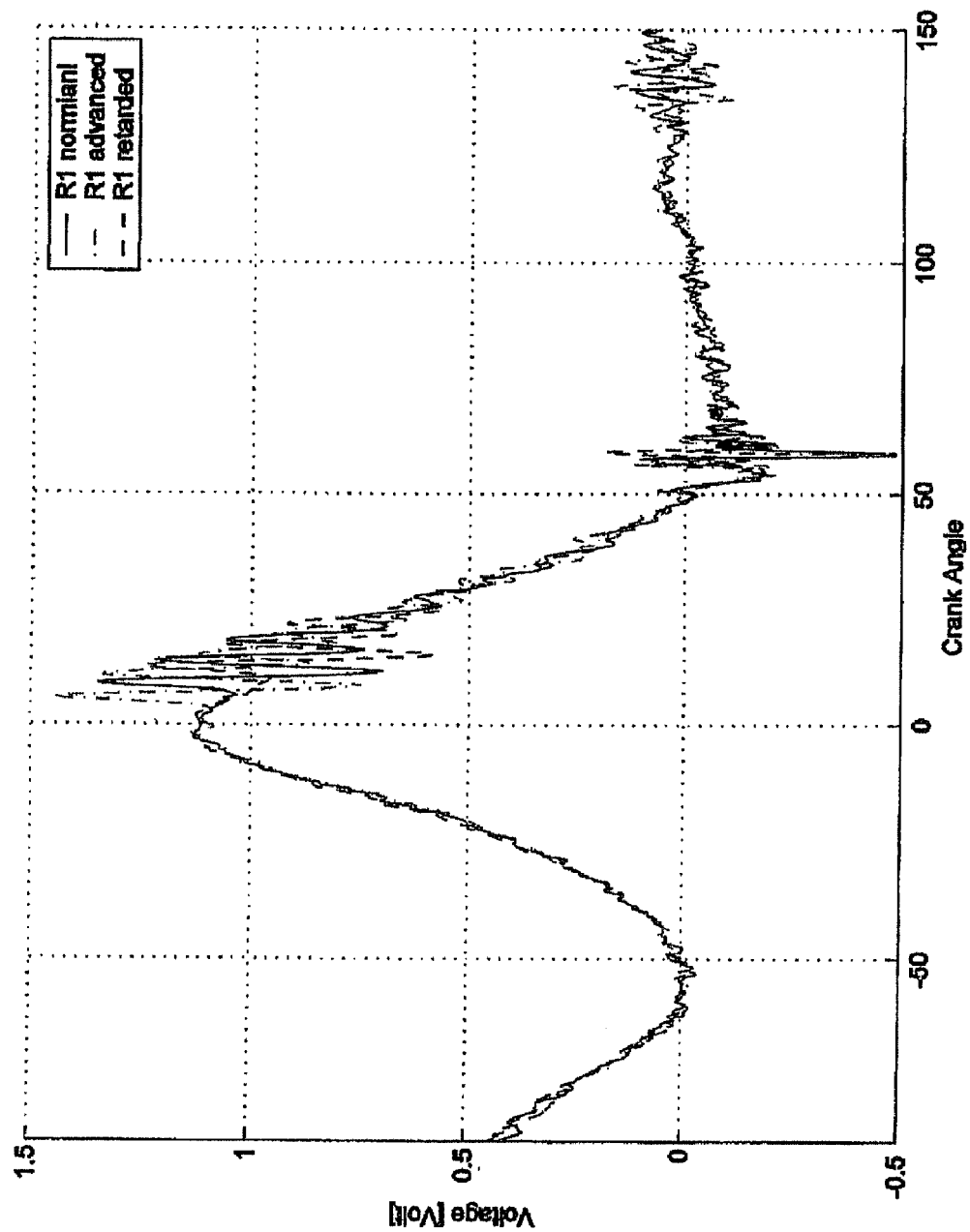
FIG. 2 is a plot of accelerometer signal data with signal voltage plotted against time measured in crank angle degrees.

FIG. 2 is a plot of data collected from an accelerometer sensor, which was mounted to the main bearing cap of an engine, as shown in FIG. 1. The accelerometer sensor transmits a signal voltage that correlates to the deflection of the main bearing cap. This graph plots signal voltage versus time, measured in crank angle degrees of rotation, for three sets of data for different timing for fuel injection. For one set of data, the timing was set at nominal, for a second set to data the timing was advanced, and for a third set of data the timing was retarded. Despite these differences in timing, the plotted data follows a similar pattern, showing that the raw accelerometer signal can produce a signal that correlates to in-cylinder pressure. The data plotted in FIG. 2 is representative of similar results observed from experimental tests conducted at many operating points.

Figure 3:
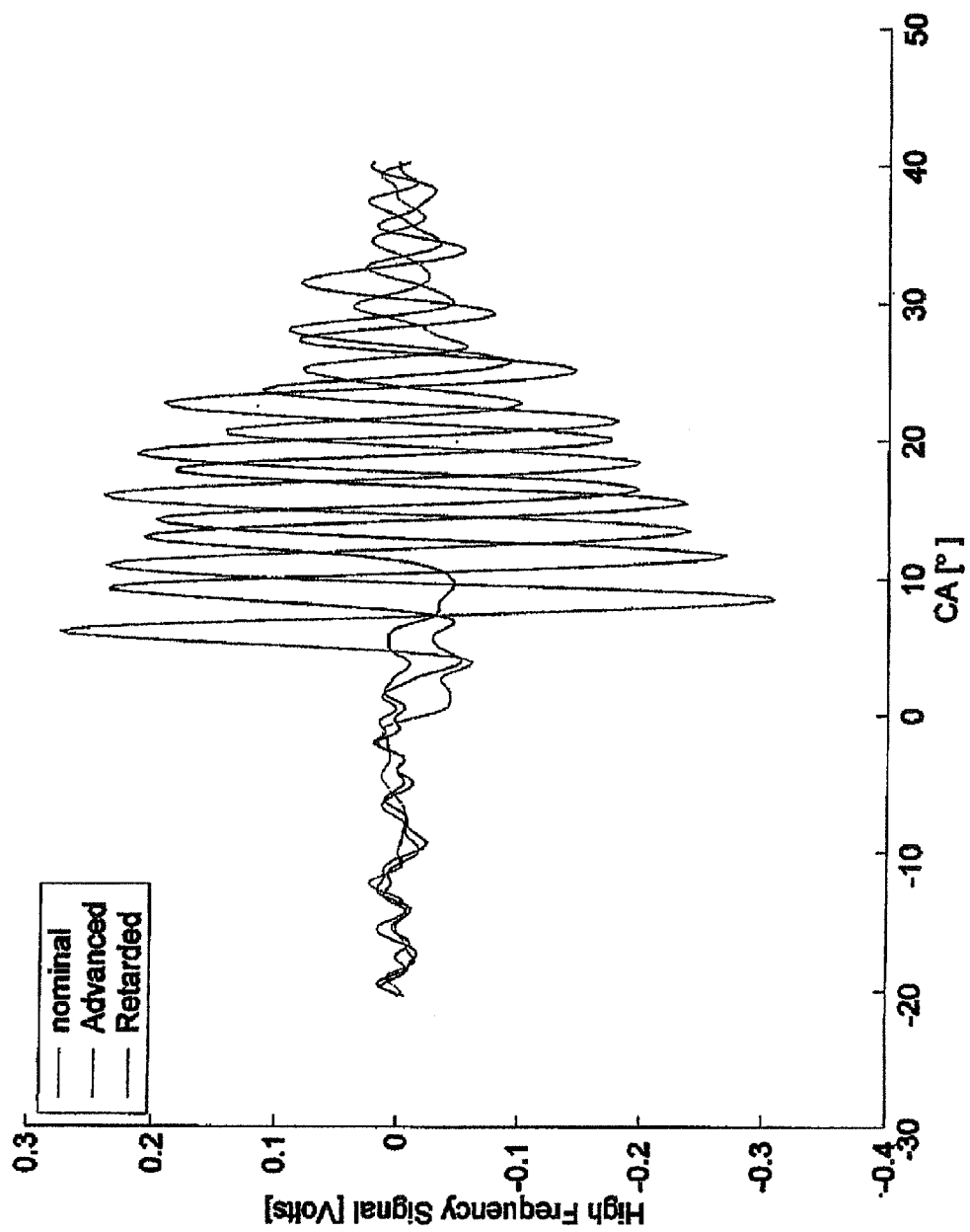
FIG. 3 is a plot of the accelerometer signal data after it has been filtered using a band-pass filter.

FIG. 3 is a plot of the same data shown in FIG. 2, after the accelerometer data was processed to subtract a component of the signal associated with the accelerations caused by the motoring pressure variations in the cylinder caused by the movement of the piston compressing the charge, absent combustion, and filtered to reduce noise from the signal. In a preferred example, a band-pass filter can be used to isolate the part of the raw accelerometer signal that corresponds to a characteristic frequency which is identified to be associated with combustion behavior. In FIG. 2 the isolated high frequency signal, measured in volts, is plotted against time, measured in crank angle degrees. The oscillations shown in the experimental data are believed to be characteristic of the test engines, which were relatively small. Data collected from larger engines showed smaller oscillations. In preferred embodiments it can be advantageous to convert the accelerometer data to absolute values before integrating it, for clearer resolution in the integrated data.

Figure 4:
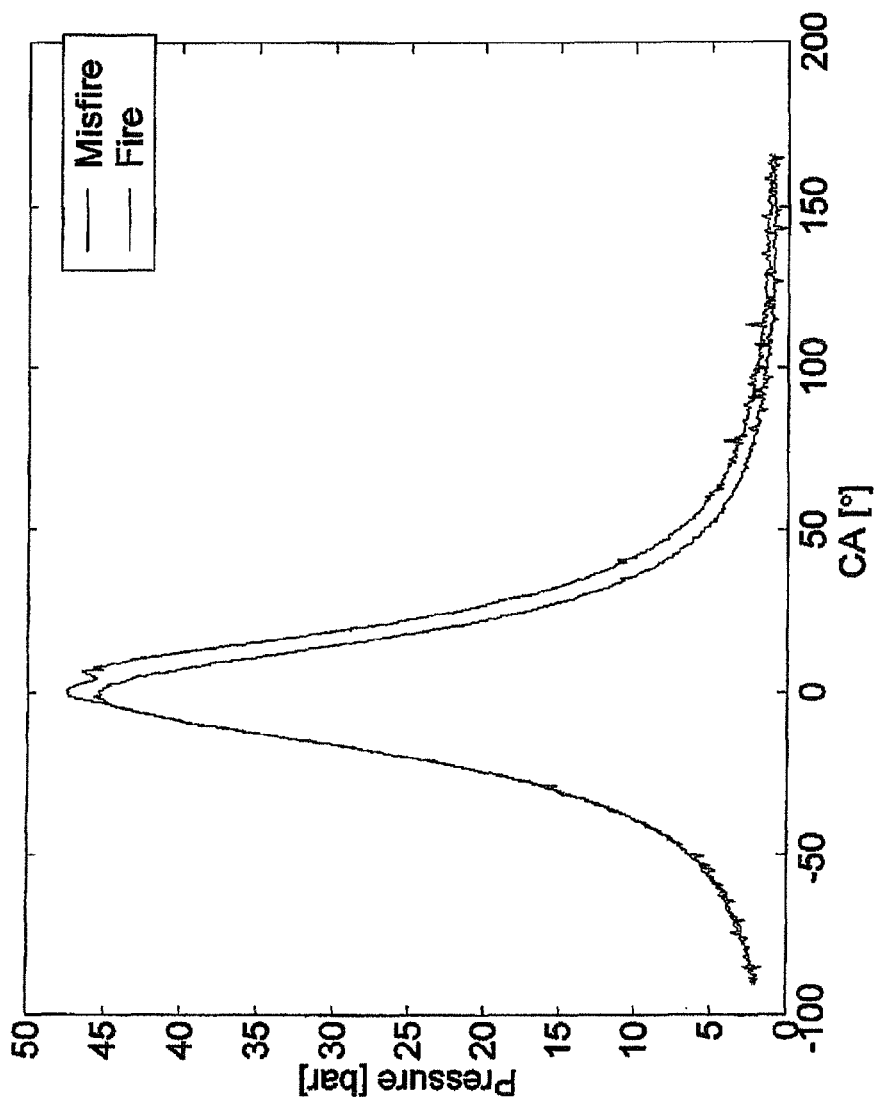
FIG. 4 shows a plot that compares the in-cylinder pressure when an engine misfires and when the engine fires and there is combustion.

FIG. 4 is a plot of the in-cylinder pressure for an engine that was idling. Two sets of data are plotted, with pressure measured in bar plotted against time measured in crank angle degrees. The data set with the higher peak is data that was collected from an engine cycle when the engine was firing. The data set with the lower peak corresponds to data collected from an engine cycle when the engine was misfiring (simulated by not injecting any fuel). The small difference between the plots of the in-cylinder pressure demonstrate why one of the most challenging operating conditions for detecting misfire is when an engine is idling.

Figure 5:
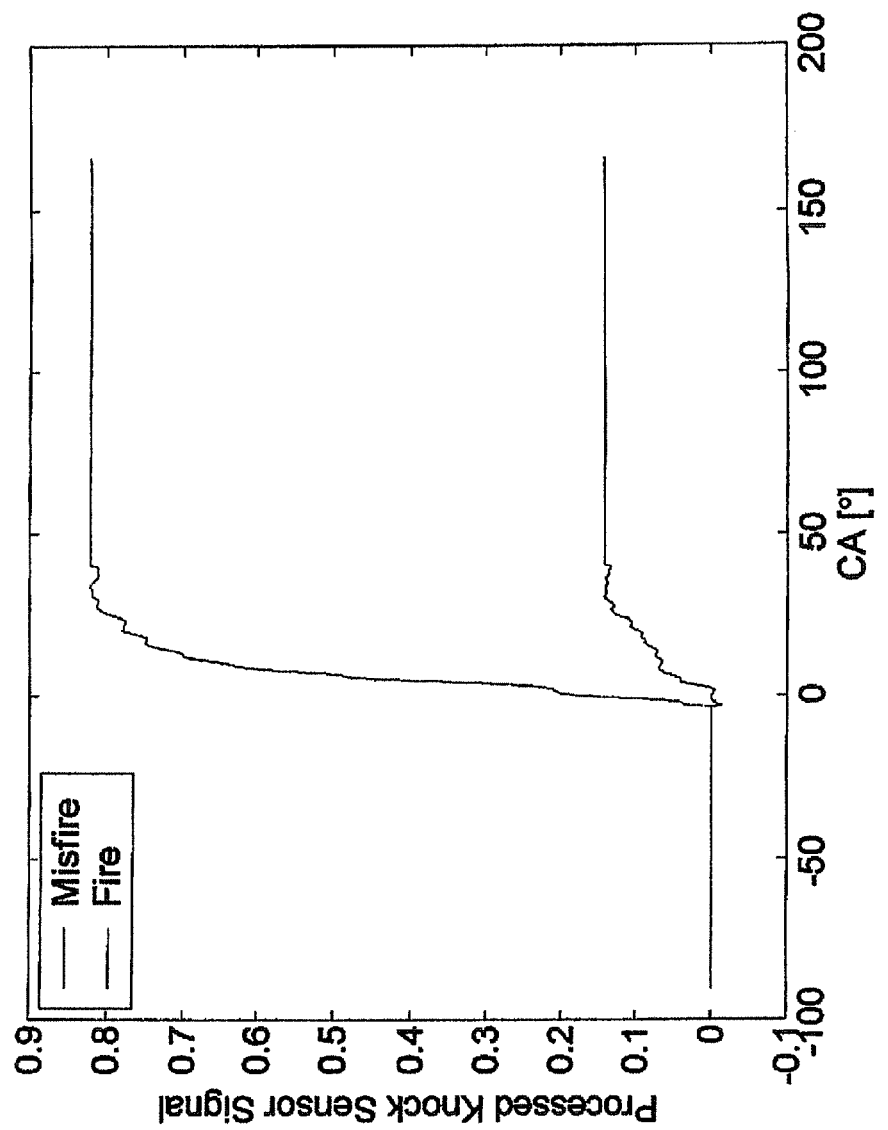
FIG. 5 plots the integrated filtered accelerometer data for the same operating point from which in-cylinder pressure data was collected for the plot in FIG. 4, showing that even when the difference between the in-cylinder pressure traces is small, the disclosed method is effective in detecting misfire.

FIG. 5 shows the effect of converting the filtered accelerometer signal data shown in FIG. 3 to absolute values and integrating it. The "processed knock sensor signal" is the integrated filtered accelerometer data. The data set with the higher plateau is the integrated data derived from the accelerometer signal for an engine cycle when the engine was firing, and the data set with the lower plateau is the integrated data derived from the accelerometer signal for an engine cycle when the engine was misfiring. The data plotted in FIG. 5 relates to the same idle operating condition associated with the data plotted in FIG. 4. Whereas it would be challenging to detect misfire by detecting the difference between the in-cylinder pressure data illustrated in FIG. 4, there is an obvious difference between the data sets plotted in FIG. 5. The steepest portion of the data set corresponds to the time when the engine was firing and is a consequence of that, and this slope is absent when misfiring occurs so misfire can be detected when this characteristically steep slope is absent. Accordingly, the characteristic feature of the predetermined reference data that can be used to detect misfiring can be the slope associated with combustion. In another approach, for each operating point the predetermined reference data could be a predetermined threshold, and when the integrated filtered accelerometer data for an engine cycle fails to rise above the predetermined threshold, misfire is detected.

The experimental results described above show that the disclosed method can be employed to detect misfiring from an accelerometer signal with high accuracy and with high robustness. The data collected for the idling operating mode is shown herein because this is one of the most challenging operating modes for detecting misfire. Data was also collected from other operating modes and the disclosed method and apparatus was able to accurately detect misfire in those operating modes too. The disclosed method and apparatus also provide additional advantages associated with accelerometer-based techniques in comparison with other techniques, including low cost, non-intrusive mounting and higher system reliability due to higher redundancy.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of using a real-time accelerometer signal to detect misfire in an internal combustion engine, said method comprising:
   (a) operating said engine at an operating point, and collecting said real-time accelerometer signal from an accelerometer sensor that comprises data characteristic of a combustion parameter;
   (b) digitizing and filtering said real-time accelerometer signal to isolate data in a frequency range associated with said combustion parameter to produce a filtered signal data set;
   (c) integrating said filtered signal data set to produce an integrated signal data set; and
   (d) comparing said integrated signal data set with a predetermined reference data set associated with said operating point, to determine when misfire occurs.

2. The method of claim 1 further comprising converting said filtered signal data set to absolute values prior to integrating it.

3. The method of claim 1 further comprising subtracting a motoring component from said filtered signal data set before integrating it.

4. The method of claim 1 further comprising comparing shapes of a plot of said integrated signal data set with that of said predetermined reference data set and detecting misfire when a predefined characteristic feature of a shape associated with said predetermined reference data set is absent from said integrated signal data set.

5. The method of claim 1 further comprising retrieving said predetermined reference data set from a look-up table.

6. The method of claim 1 further comprising collecting said predetermined reference data set from a calibration engine of the same model and specification as said engine, and storing said predetermined reference data set in a look-up table.

7. The method of claim 6, wherein said predetermined reference data set was collected from said calibration engine when it was firing, and when comparing said integrated data set to said predetermined reference data set, misfire is detected when a plot of said integrated signal data set does not include a slope within a predetermined range defined in relation to a characteristic slope associated with said predetermined reference data set.

8. The method of claim 6 wherein said predetermined reference data set comprises a threshold limit associated with each operating point in said look-up table and misfire is detected when said integrated signal data set comprises data that is below said threshold limit.

9. The method of claim 1 further comprising counting detected misfires, and when more than a predetermined number of misfires are counted, commanding said engine to operate with reduced power output until it can be diagnosed to determine why said misfires have occurred.

10. The method of claim 1 further comprising counting detected misfires, and when more than a predetermined number of misfires are counted, sending a warning to an operator of said engine so that said engine can be diagnosed to determine why said misfires have occurred.

11. The method of claim 1 further comprising counting detected misfires, and when more than a predetermined number of misfires are counted, limiting how many times that the engine can be re-started to prevent said engine from being operated for a prolonged time without being diagnosed to determine why said misfires have occurred.

12. The method of claim 1 further comprising rejecting a determination that misfire has occurred if a secondary indicator of firing indicates that said engine did fire.

13. The method of claim 1 wherein said operating point is defined by engine speed and load.

14. A control system for an internal combustion engine, said control system comprising:
- an accelerometer sensor mounted to said internal combustion engine at a location where said accelerometer sensor can detect oscillations that correlate to a combustion parameter;
- a look-up table in which is stored a predetermined reference data set, in association with a predetermined operating condition;
- an electronic controller programmed to receive a real-time accelerometer signal from said accelerometer sensor when said engine is operating at said predetermined operating condition, to digitize and filter said real-time accelerometer signal to isolate data in a frequency range associated with said combustion parameter to produce a filtered signal data set, to integrate said filtered signal data set to produce an integrated signal data set, and to compare said integrated signal data set to said predetermined reference data set to determine when misfire occurs; and
- a signal wire for transmitting said signal from said accelerometer sensor to said electronic controller.

15. The control system of claim 14 wherein said electronic controller is the electronic control unit for said engine.

16. The control system of claim 14 wherein said predetermined reference data set is derived from filtered and integrated accelerometer sensor data that was collected from a calibration engine when it was firing.

17. The control system of claim 14 further comprising a hardware filter between said accelerometer sensor and said electronic controller to pre-process said real-time accelerometer signal.

18. The control system of claim 14 wherein said real-time accelerometer signal is a voltage signal and said electronic controller is programmed to convert said voltage signal to absolute values before integrating it.

19. The control system of claim 14 wherein said electronic controller is programmed to compare shapes of a plot of said integrated signal data set from said real-time accelerometer signal with that of said predetermined reference data set and detecting misfire when a predefined characteristic feature of a shape associated with said reference data set is absent from said integrated signal data set.

20. The control system of claim 14 wherein said predetermined reference data set comprises a characteristic slope associated with a plot of a filtered and integrated data set collected from a calibration engine when it was firing, and said electronic controller is programmed to compute slopes of a plot of said integrated signal data set, and to detect firing when said computed slopes include a slope within a predetermined range defined in relation to said characteristic slope.

21. The control system of claim 14 wherein said predetermined reference data set comprises for each operating point, a threshold limit selected between integrated data associated with firing and integrated data associated with misfiring.

22. The control system of claim 14 wherein said electronic controller is programmed to count detected misfires, and when more than a predetermined number of misfires are counted, said electronic controller is programmed to command said engine to operate with reduced power output until said engine can be diagnosed to determine why said misfires have occurred.

23. The control system of claim 14 wherein said electronic controller is programmed to count detected misfires, and when more than a predetermined number of misfires are counted, said electronic controller is programmed to send a warning to an operator of said engine so that said engine can be diagnosed to determine why said misfires have occurred.

24. The control system of claim 14 wherein said electronic controller is programmed to count detected misfires, and when more than a predetermined number of misfires are counted, said electronic controller is programmed to limit how many times said engine can be re-started to prevent said engine from being operated for a prolonged time without being diagnosed to determine why said misfires have occurred.

25. The control system of claim 14 wherein said electronic controller is programmed to reject a determination that misfire has occurred if a secondary indicator of firing indicates that said engine did fire.

* * * * *